United States Patent [19]

DuVall

[11] 4,162,481
[45] Jul. 24, 1979

[54] ADAPTIVE CORRELATOR FOR VIDEO PROCESSING

[75] Inventor: Dale R. DuVall, Keller, Tex.

[73] Assignee: Recognition Equipment Incorporated, Irving, Tex.

[21] Appl. No.: 753,665

[22] Filed: Dec. 22, 1976

[51] Int. Cl.² ............................................. G06K 9/00
[52] U.S. Cl. ................ 340/146.3 AG; 340/146.3 MA
[58] Field of Search .............. 340/146.3 AG, 146.3 R, 340/146.3 D, 146.3 MA, 146.3 H, 146.3 AC; 235/151.3; 358/282, 284

[56] References Cited

U.S. PATENT DOCUMENTS

| | | | |
|---|---|---|---|
| 3,234,513 | 2/1966 | Brust | 340/146.3 AG |
| 3,705,383 | 12/1972 | Frayer | 340/146.3 CA |
| 3,723,970 | 3/1973 | Stoller | 340/146.3 AG |
| 3,737,855 | 6/1973 | Cutala | 340/146.3 AG |
| 3,761,876 | 9/1973 | Flaherty et al. | 340/146.3 AG |
| 3,805,239 | 4/1974 | Watanabe | 340/146.3 MA |
| 3,918,049 | 11/1975 | Snyder et al. | 340/146.3 AG |
| 3,973,239 | 8/1976 | Kakumoto et al. | 340/146.3 MA |
| 3,999,047 | 12/1976 | Green | 235/151.3 |
| 4,047,152 | 9/1977 | Giuliano et al. | 340/146.3 AG |

OTHER PUBLICATIONS

Dorr et al., "Adaptive Thresholding for a Mark Reading System", *IBM Tech. Disclosure Bulletin*, vol. 15, No. 8, Jan. 1973, pp. 2597-2598.

*Primary Examiner*—Leo H. Boudreau
*Attorney, Agent, or Firm*—John E. Vandigriff

[57] ABSTRACT

In optical character recognition systems scanning may be accomplished by a multi element scanning matrix, in which each element detects a portion of the reading field and an output voltage is generated for each element depending upon whether the element is looking at the dark character or a portion of the background which usually is of a lighter shade. The instantaneous output of each element is digitized with a value dependent upon the amount of light detected by the cell and may have a value from 0 to fifteen. This digitized quantized information is then used to make a black/white decision for each cell, for example, if the information is background or is representative of a character being read. Improper referencing of the background due to reflective variation caused by multi colored backgrounds or different paper textures may cause an incorrect reading and make a black/white decision which is in error. This invention describes a technique for determining an improper reference background and subsequently altering the parameters to restore satisfactory performance.

12 Claims, 12 Drawing Figures

ADAPTIVE CORRELATOR FOR VIDEO PROCESSING

FIELD OF INVENTION

This invention relates to optical character recognition systems and more particularly to an adaptive correlator to properly reference the background of a document being read.

BACKGROUND OF THE INVENTION

In optical character recognition systems video image information is reduced to a black/white decision from multi level gray information before character recognition can be accomplished. The performance of any character recognition technique is dependent upon the quality of the video information being processed. The technique for reducing mutli level image information to black/white decisions determines the quality of the video image. One such technique for the data reduction to black/white images is referred to as correlation. Correlation is achieved by taking digitized and quantized output values for each cell in a scanning matrix to generate a black or white data signal for each cell. The values of the cells surrounding the data point cell are summed and added to the value of the data point cell. Such a correlation technique is found in U.S. Pat. No. 3,761,876. In that patent, the value of the data point cell is multiplied by the number of cell values summed and compared with the cell value sum. A relative black signal is generated if the cell value sum is greater. Problems occur however, when the background from which a character is to be read is improperly established. Improper referencing of the background may be due to reflectance variations caused by multi colored backgrounds, paper textures, and other markings independent of that which is to be read, which result from ink smears or over printing on documents such as checks due to cancellations or endorsements. It is apparent then that it is necessary to be able to take into account such interfering backgrounds which tend to prevent the system from accurately reading the information printed thereon.

SUMMARY OF INVENTION

This invention relates to a technique for determining an improperly read reference background and subsequently altering the correlator parameters to restore satisfactory performance. The overall system consists of a video lift, a read window selection logic, and the adaptive correlator and its associated background determining circuit.

The video lift consists of a lens system, a photo sensitive array for the conversion of light energy into electrical signals and the electronics which convert the anlog signals into digital video information. The read window select logic selects the portion of the digital video which is to be processed for character recognition. The data correlator with its background determining circuitry provides a means of converting the selected multi level digital information into black/white decisions. The background determination circuit continuously monitors the video levels present and provides control signals to the correlator so that proper parameters used for correlation can be determined.

DESCRIPTION OF THE DRAWINGS

For a more complete understanding of the present invention, and for the technical advances represented thereby, reference is now made to the following description taken into conjunction with the accompanying drawings in which;

Referring to FIG. 1 there is shown a partial system used in optical character recognition. A video lift 11 reads the information on the document 10. The video lift maybe a self scanning array made up of a plurality of photo sensors. As the sensor array scans, it reads the information on document 10 and tranmits it to the window select logic 12 in the form of a multi level digital video signal which covers the area read by the scanned matrix. Selected multi level digital video 16 is then supplied to the adaptive correlator 13. Adaptive correlator 13 is then made up of the correlator 15 and a background determining circuit 14. The output from the adaptive correlator is a black/white video signal which is sent to a character recognition unit. The background determining circuitry 14 processes the selected multi level digital video and supplies a correlation selection parameter 17 to the correlator.

In order to illustrate the operation of the adaptive correlator, it is desirable to describe the functional characteristics of a typical correlator. In such a correlator, picture elements (smallest element of resolution in the video system, hereinafter referred to as a pixel) are input as a multi level video code representing the measured reflectance of the information from the document. The correlator reduces a pixel to a black/white decision. The decision is based on a comparison of the pixel and the value of a 5×5 pixel area, the pixel in question being in the center of the area. The pixel being quantized is referred to as the center pixel and the 25 pixel sum is referred to as the area sum. For each value of the area sum there is a value at which the black/white decision for the center pixel is made. The value of the area sum versus the decision values referred to as the characteristic correlator curve.

Figure 2:
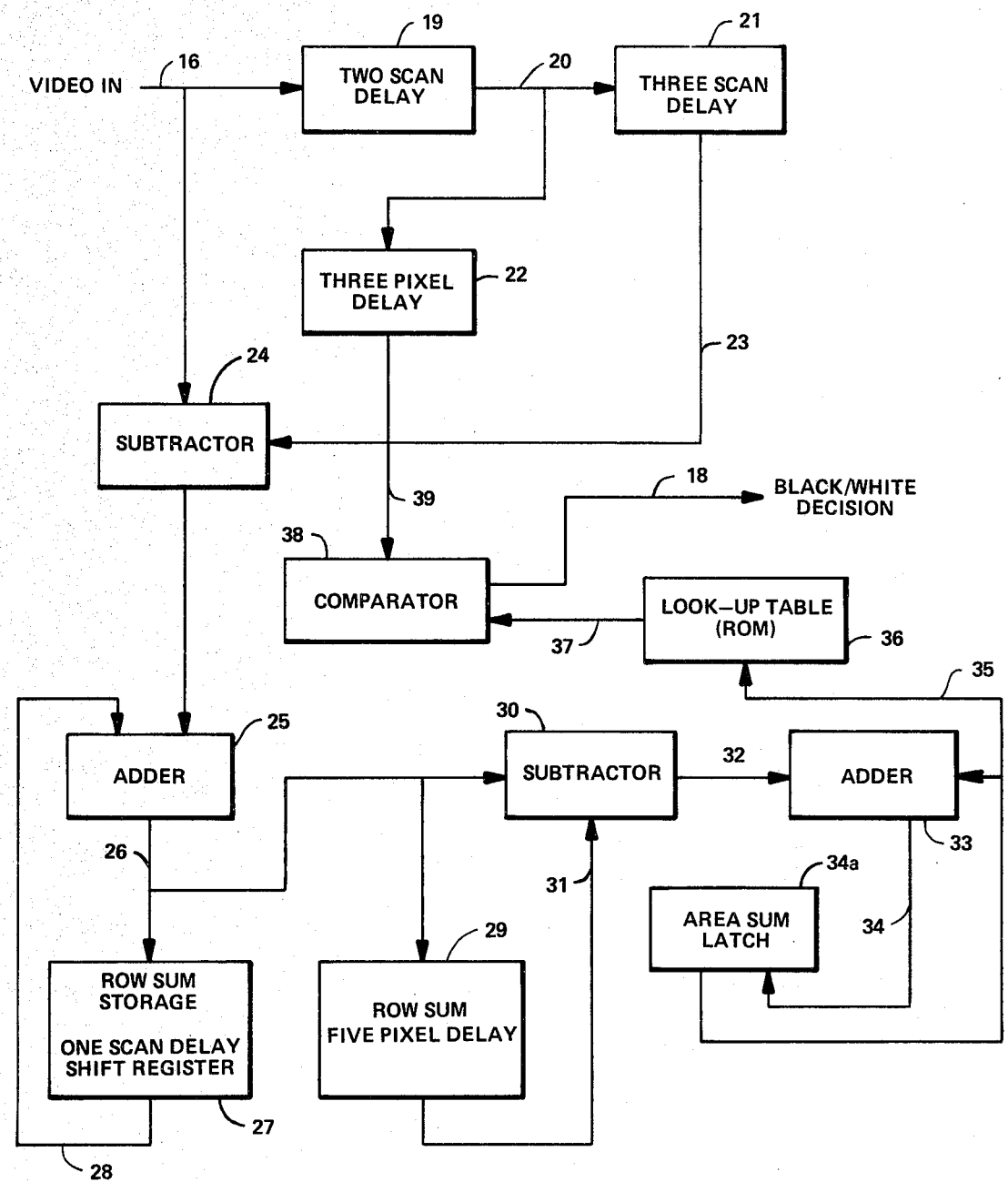
FIG. 2 is a block diagram of the correlator circuit shown in FIG. 1.
Figure 4:
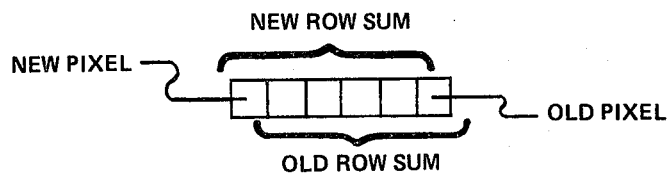
FIG. 4 illustrates the relationship between an old row sum and a new row sum.

The input video (pixel) is input serially as the data lift scans vertically. Horizontal scanning is accomplished by multiple vertical scans as a document moves horizontally. In order to obtain the area sum, row sums are first obtained and then accumulated. A row sum is the sum of five horizontally adjacent pixels. FIG. 2 is a block diagram of a basic correlator. Initially all registers are reset, input video 16 is routed to both a subtractor 24 and a five scan delay line which is made up of two scan delay 19 and three scan delay 21. The output of the delay line is fed by line 23 to subtractor 24. The difference between the video in 16 and the delayed video on line 23 is used to generate new row sums and is combined in subtractor 24. The output of subtractor 24 is routed to adder 25. The difference is used to generate new row sums. The difference is added to the row sum value 28 yielding a new row sum value 26. The new row sum value 26 is routed through a one scan delay 27 becoming the row sum 28. Mathematically the resulting new row can be expressed as follows. New row sum equal to old row sum plus (new pixel minus old pixel). This is graphically illustrated in FIG. 4 and may be mathmatically expressed as follows.

$$\text{New row sum} = \sum_{i=n+1}^{n+5} \text{Pixel}_i = \sum_{i=n}^{i=n+4} \text{Pixel}_i + (\text{Pixel}_{n+5} - \text{Pixel}_n)$$

$i = \text{scan } i$

The area sums are generated by this same accumulative technique. First, the new row sum 26 is subtracted from the old row sum 31. The old row sum 31 is obtained by delaying the new row sum 26 five pixel times at shift register 29. This difference 32 is then added to the area sum 35 to obtain the new area sum 34. Area sum latch 34a retains the area sum for the next update and is used to route the area sum to the lookup table (ROM) 36. The process of adding the difference of the old row sum and the new row sum to the present area sum continually updates the area sum about the pixel of interest.

The corresponding center pixel of this area 39 is obtained from the three pixel delay shift register 22. The process of accumulating first the row sums and secondly the area sum requires a five scan and a five row delay from the input video. The corresponding center pixel is two scans and three pixel delayed from the current input video pixel.

The lookup table 36 provides a black/white decision value 37 to comparator 38. If the center pixel 39 is greater than this value, the pixel is output as black on line 18. If this condition is not met, the decision is white.

The decision 18 is routed to the character recognition for additional processing.

Figure 3:
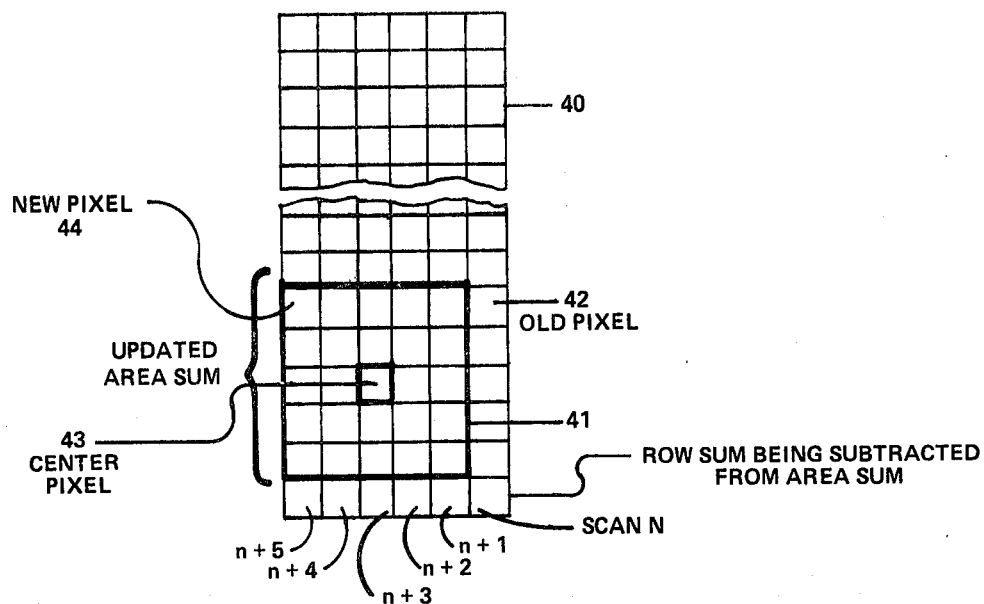
FIG. 3 illustrates the relationshp between the picture elements and the area sums and row sums used by the correlator.

A graphic illustration of the correlator of FIG. 2 is illustrated in FIG. 3.

Figure 5:
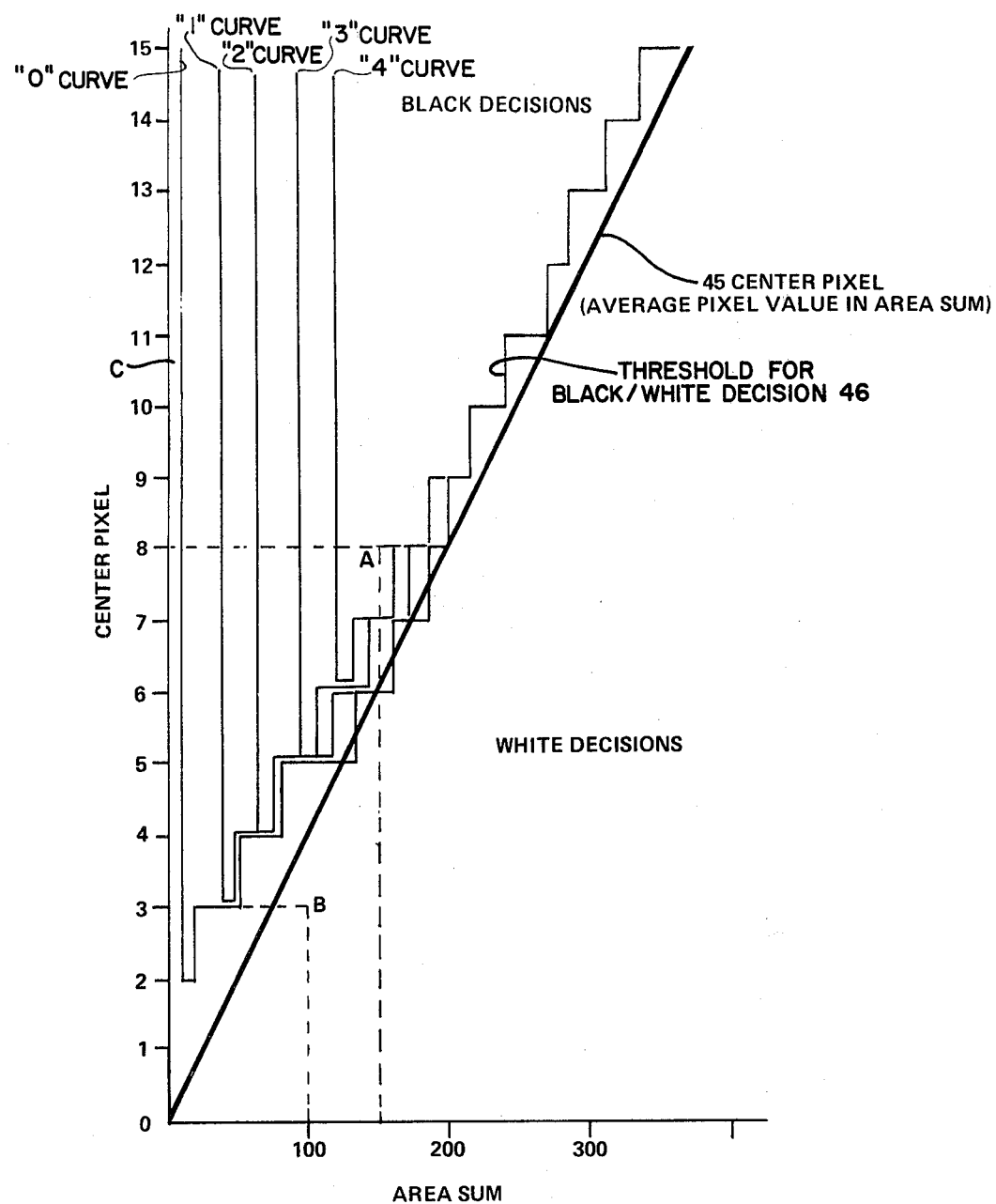
FIG. 5 is a graph illustrating one correlation curve.

A typical correlator curve contained in the lookup table 36 is illustrated in FIG. 5. The diagonal line 45 represents a point at which the center pixel is equal to the average value of all the pixels in the area sum. The actual curve varies from this line by differing amounts for differing contrasts. The curve is optimized on the assumption that the background level is typically zero.

Figure 6:
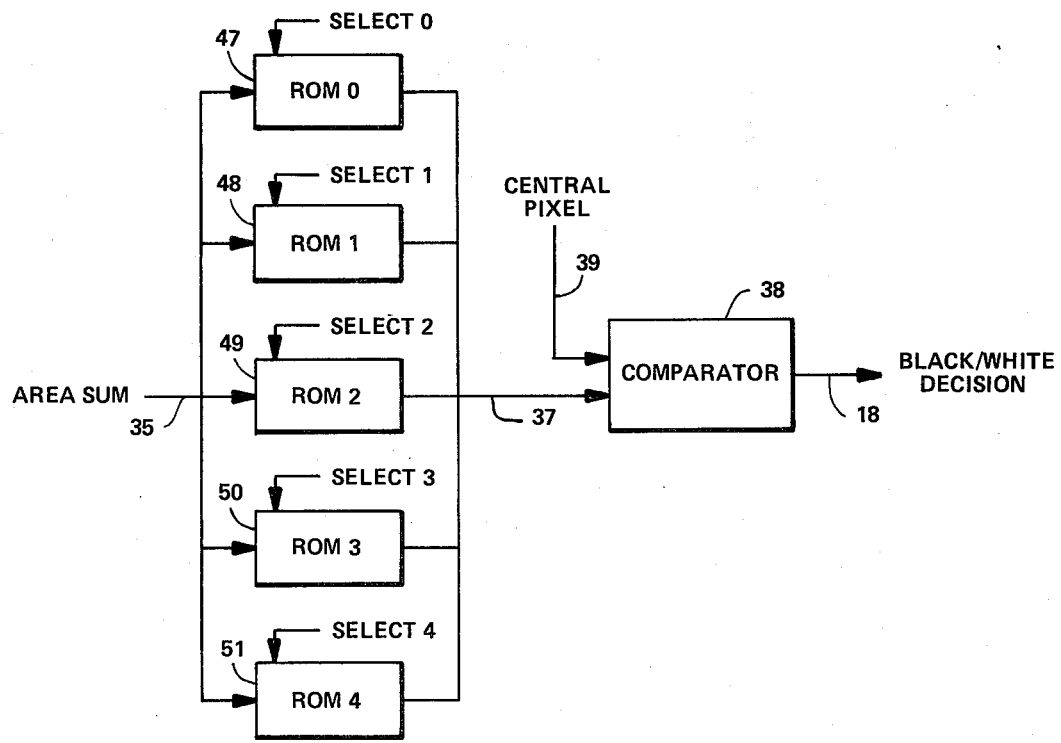
FIG. 6 illustrates a plurality of read only memorys used to provide multiple correlation curves.

In order to provide an adaptive correlator in which multiple correlation curves may be used, new background information is updated from one scan to the next, the lookup table ROM 36 is replaced with a plurality of ROMS as illustrated in FIG. 6. FIG. 6 shows a lookup table of five different ROMs. Any number of ROMs maybe used, however, for purposes of illustration, the lookup table has been limited in this example to five. ROMs 47 through 51 have been designated as ROM 0, ROM 1, ROM 2, ROM 3, and ROM 4 respectively.

The area sum 35 out of the sum latch 34a is routed to each of the ROMs. Each ROM has a select line input. For example, ROM 0 has Select 0, ROM 1 has select 1, etc. The output of each ROM is combined together into a bus 37. The output depends upon which ROM is enabled. The output bus 37 is routed to a comparator 38 for comparison to the center pixel 39 as described above. Comparator 38 in FIG. 6 is the same comparator as comparator 38 in FIG. 2. The enabling voltages for the Select line 0 to Select line 4 are generated in background circuitry described hereafter. Different select lines can be enabled on a scan by scan basis allowing the correlator to continually change curves depending upon the background variation of the document being read.

Figure 7:
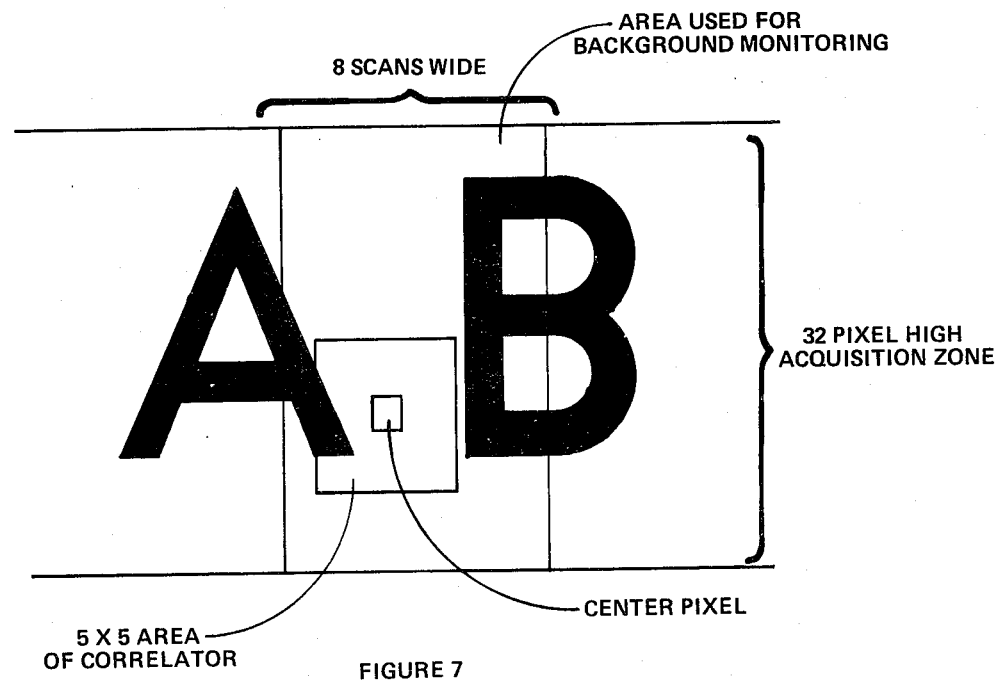
FIG. 7 illustrates the relationship of the large area for background monitoring versus correlation area.
Figure 8:
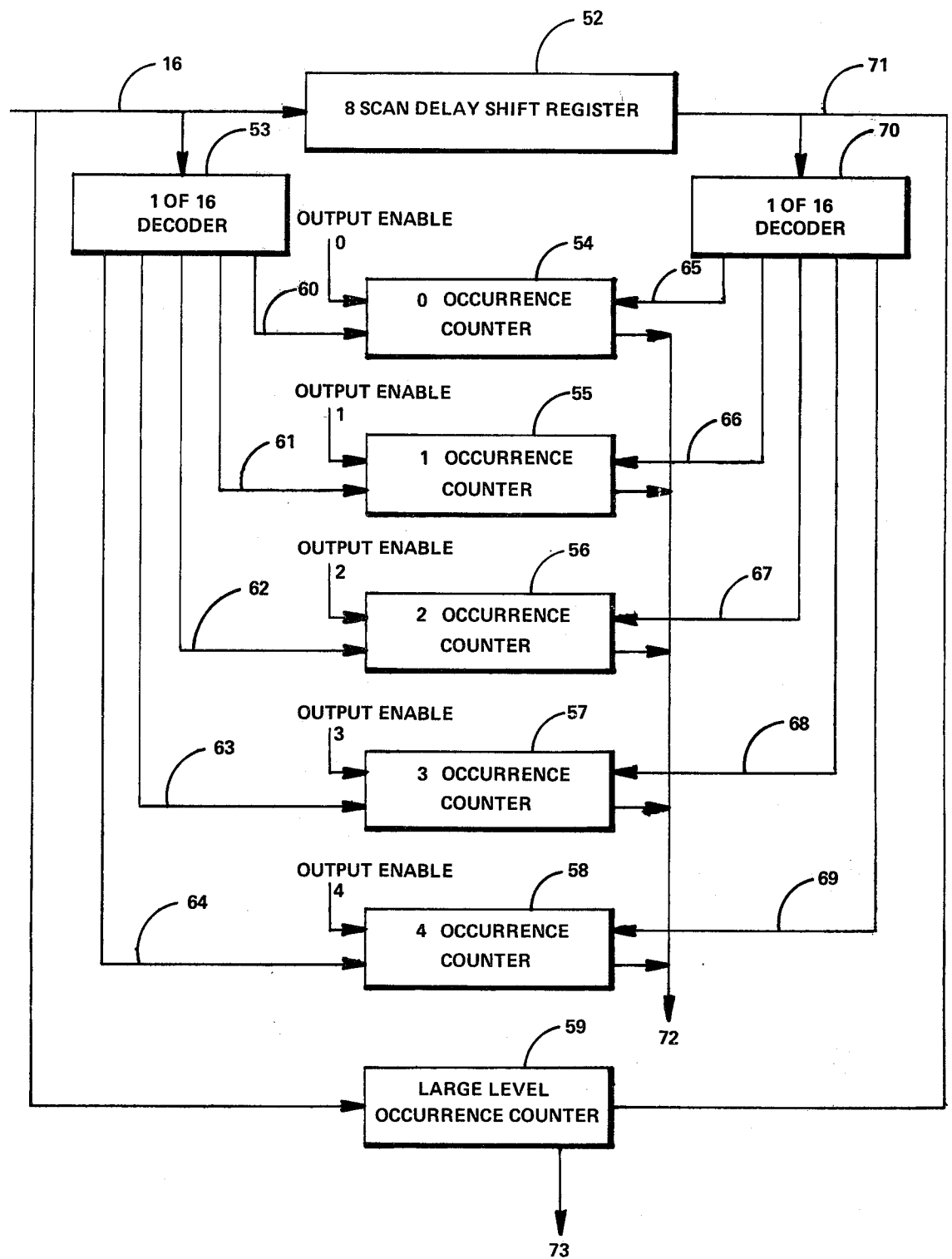
FIG. 8 is a block diagram of the occurance counter used in determining correlation background.

The background determining circuitry provides a means by which improperly referenced background can be detected and for which there can be compensation. In order to determine that the background level is properly referenced, an area thart is large with respect to the 5×5 pixel area of the correlator is examined. The occurrence of non-white (non zero) values of pixels are monitored. The basic technique assumes (1) a large number of pixels in this large area contain background, (2) the lightest levels of gray represent potential background levels and, (3) the darker levels of gray represent information levels, (4) values used are black equals 15, white equals 0 and grays are values in-between. The determination of a non zero background is used to select a proper correlator curve for the determined background. Instead of the single correlator curve described earlier, the series of ROMS illustrated in FIG. 6, each with a different curve, are individually selected as dictated by the background monitoring circuitry. The background monitoring circuit is continuously updated as new video information is processed so that the selected curve is based entirely on an area in the proximity of the pixel being correlated. An illustration of the background area and the 5×5 correlated area is shown in FIG. 7. It should be noted that the area used for monitoring is about eight scans wide and 32 pixels high. The 5×5 area of the correlator is continually moving through the monitored area as the area is scanned and area sums continually updated so that the correct correlation curve is used. The basic principle is based on the occurrence of each of the lighter video levels. The first criteria determining the background level is based on which light level of gray, including zero, has the most occurrences in the large area. An additional criteria that may be used is that when two adjacent levels of gray have occurrences nearly equal, then the larger level is chosen when sufficient values of dark video (indicitive of information level) are present. When the darker levels are not present in sufficient quantities, the lighter level is chosen. As illustrated in FIG. 7, the large area is eight pixels wide by 32 pixels high. The shades of light gray used for background determination are values of zero through 4. The values used for the darker gray information content is eight or greater. In order to determine the occurrences of the various shades, binary counters called occurrence counters are used to count the number of times each background value is present in the area. It should be noted that the area used to determine the background value is always a fixed size (8×32=256 pixels) and is continually moved concurrently with the scanning of the documents. In this manner only the area within the proximity of the pixel to be correlated is used. This technique describes a real-time process for correlator curve selection. That is continually varied during the scanning of the documents. This technique eleminates the need for large amounts of data storage which would be required if these calculations were not accomplished at the input scan rate. The occurrence counters are illustrated in FIG. 8. The occurrence counters are continually updated to maintain the count of the number of pixels with the values of zero through 4 and eight or above.

Referring now to FIG. 8 the gray video information 16 simultaneously enters an eight scan delay shift register 52 and a one of 16 decoder 53. The video is also routed to a large level occurrence counter 59. A decoder 53 generates a true logic signal on its approximate out put line representive of the input value. This same decoding is done for the delayed video 71 at decoder 70. Corresponding decoder values from both decoders 60 and 65, 61-66, 62-67, 63-68, and 64 and 69 are routed to their respective occurrence counters 54, 55 56, 57, and 58 respectively. The delayed output 71 is also routed to the large level of current counter 59.

Figure 1:
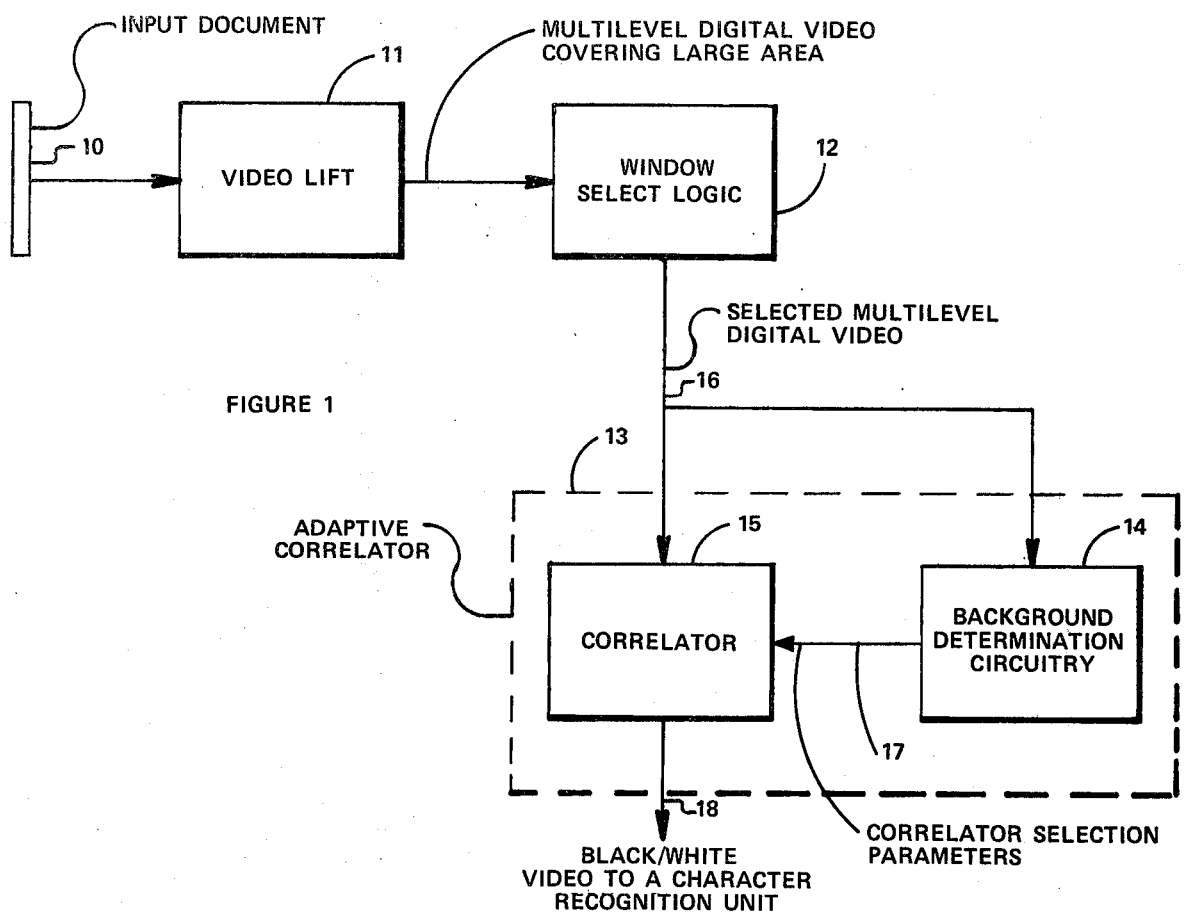
FIG. 1 is a block diagram of the video lift window logic and adaptive correlator.
Figure 9:
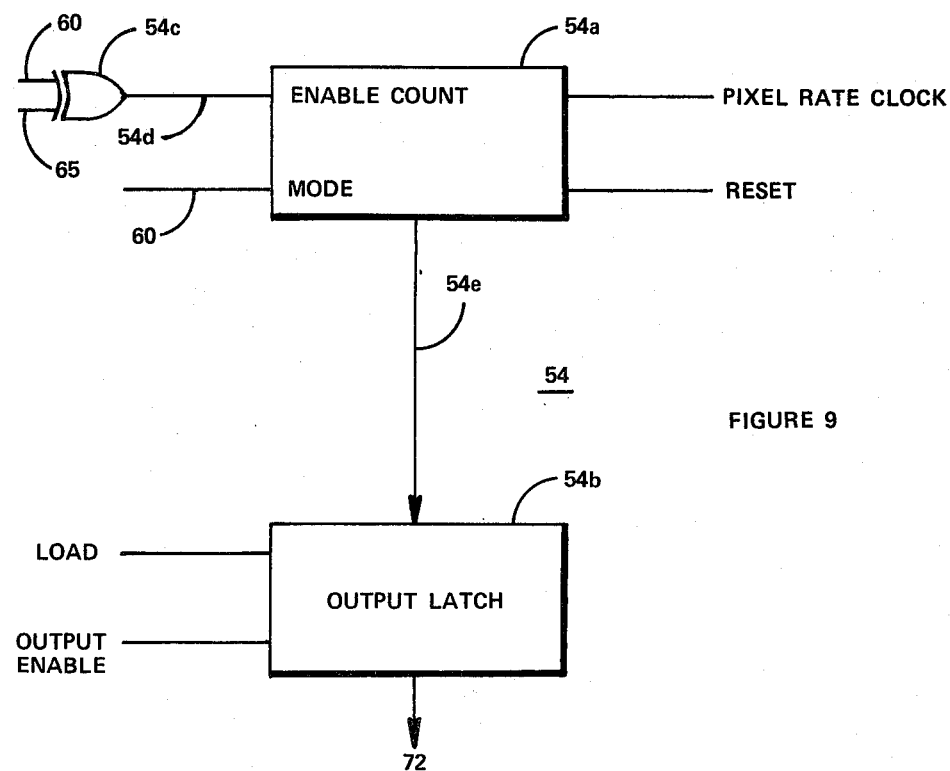
FIG. 9 is a more detailed block diagram of the occurance counter illustrated in FIG. 8.

A typical occurrence counter circuit is illustrated in FIG. 9. The counter consists of an input control gate, an up/down counter, and an output latch with tristate outputs. By way of illustration, the occurrence counter 54 will be described and the inputs thereto refer back to the input to counter 54 shown in FIG. 8. Inputs 60 and 65 correspond respectively, to the decoded count before and after the eight scan delay. The input 60 is a logical "1" when the cell value to be counted is entering the 8 scan delay shift register (52, FIG. 8). Similarly, the input 65 is a logical "1" when the value to be counted is on the output of the 8 scan delay shift register. The exclusive "OR" gate 54c thus inhibits the counter from counting when the same value is both entering and leaving the delay. (This corresponds to no change in the occurrences of the value to be counted in the 8 scan area) When the value to be counted is entering the area only (input to the 8 scan delay), the counter is incremented because both lines 54d and 60 will be a logical "1". When the value to be counted is leaving the area (output of the 8 scan delay), 60 will be a logical "0", 54d a logical "1", causing the counter to decrement. In this manner the counter always contains the occurrence of value 60 and the last 256 (32 pixels high by 8 scans wide) pixel input. At the end of each scan the counter output 54e is transferred into the latch 54e by a load pluse. The output of the latch is part of the tristate bus 72 which is common to all the outputs of all other output latches for the other occurrence counters.

Figure 10:
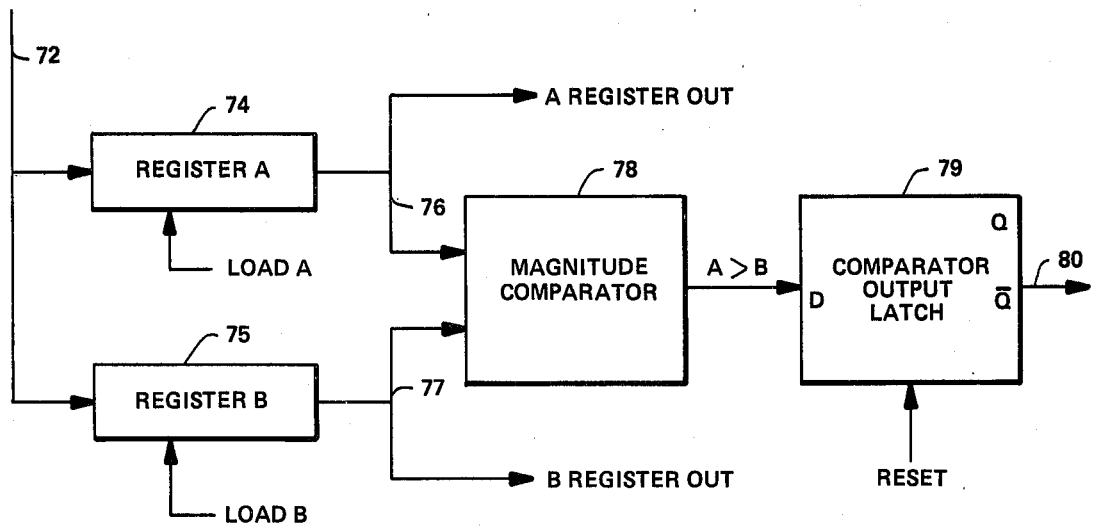
FIG. 10 is a block diagram of the magnitude comparator circuit used in comparing picture element values.
Figure 11:
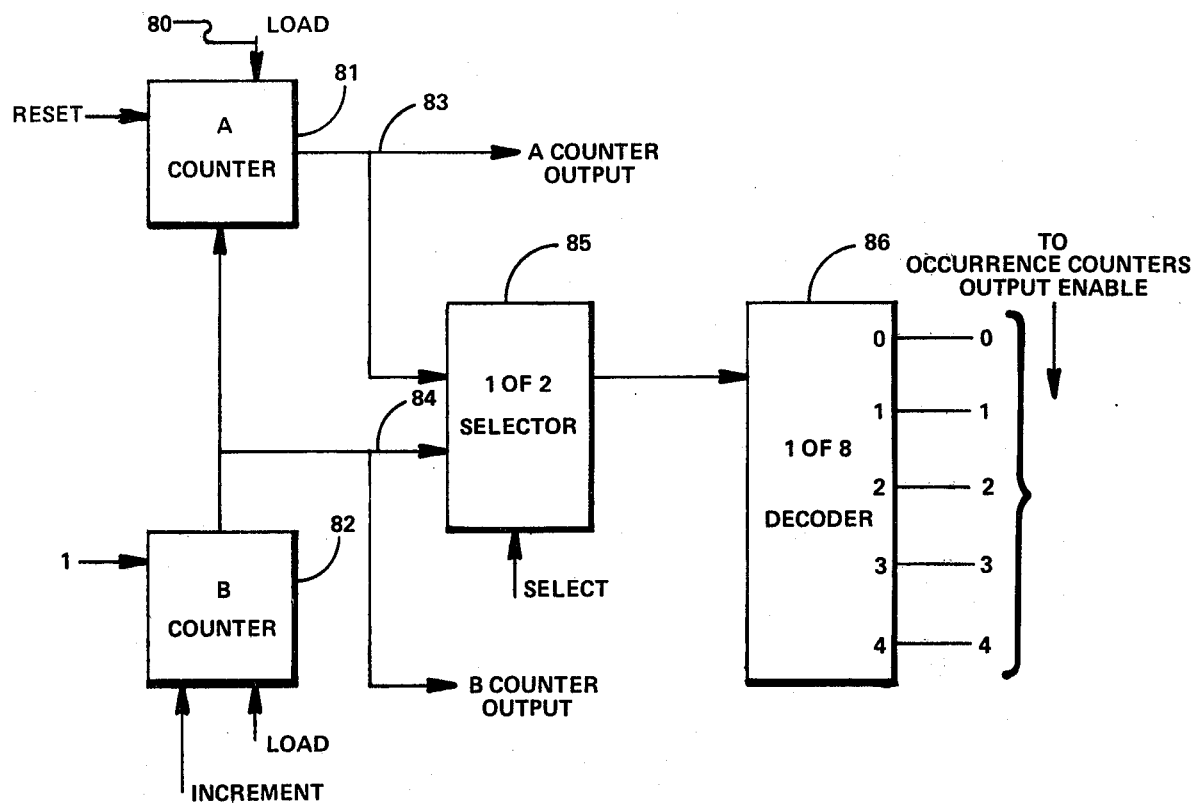
FIG. 11 is a block diagram of a counter circuit used in enabling the occurance counters shown in FIG. 8.

The background selection logic goes through a sequence of comparisons of each occurrence counter value once per scan. This sequence determines the occurrence counter with the largest number. This determination in turn is used to generate the enable signals to the correlator logic so that the correlator curve best suited to the measured background can be selected. The background selection logic consists of two storage registers 74 and 75 as illustrated in FIG. 10. These are also referred to as register A and register B. The magnitude of the numbers in registers A and B are compared by the comparator 78. The comparator decision A greater than B is retained in the comparator output latch 79. This comparator decision is used to control two counters, counter A and counter B designed respectively as 81 and 82 (FIG. 11). The two counters are used in turn to control which occurrence counters are to be selected for the next comparison. The counter outputs, 83 and 84 are alternately selected and their outputs decoded so that the appropriate occurrence counter outputs can be selected sequentially for loading into register A and register B. After the occurrence counter with the largest number is determined, this information is retained and then decoded to select the appropriate correlator curve.

The operation of the background selection logic is as follows. At the beginning of each scan, the comparator output latch is reset. The A counter is reset to "0" and the B counter is preset to "1". After this initialization takes place the following steps are repeated through four successive sequences to determine the occurrence value with the greatest count. (1) Select the A counter value at the selector 85 and subsequently decode the occurrence counter output enable signal at decoder 86. (2) Load the output of the selected occurrence counter in register A and select the B counter value at selector 85 and subsequently decode the occurrence counter value at decoder 86. (3) Load the B register and make the comparison of the A and B registers at comparator 78 and store the results in the comparator output latch 79. (4) Increment the B counter and leave the contents of the A counter unchanged if A is greater than B, load the B counter value in counter A if B is greater than A.

This sequence is repeated until the values of occurrence counters 0 through 4 have been examined. At the end of this comparison cycle, the A counter contains the number of the occurrence counter which has the largest value. The value of the A counter, or the A counter value plus one is used for correlation curve selection based on the secondary criteria that the background level one greater than the one in the A counter occurred nearly as often as the one in the A counter. This determination is accomplished as follows.

Figure 12:
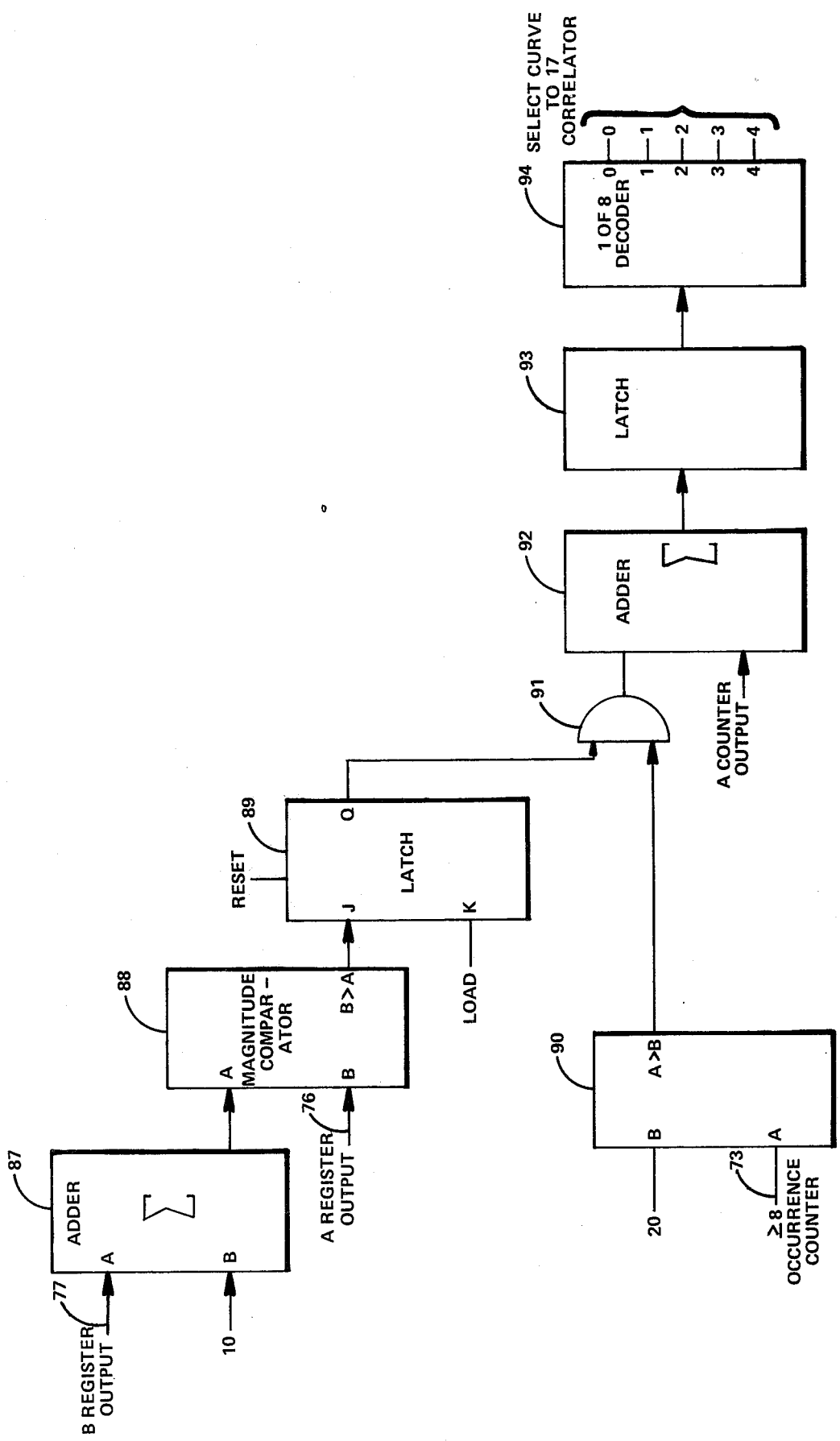
FIG. 12 is a block diagram of the circuitry used for selecting which correlation curve will be used in the correlator.

The second criteria of the background selection procedure examines the value of the occurrence counter one level greater than the occurrence counter with the largest value in it. Typically a difference of less than ten is required before the large number occurrence counter is considered. The second conditon for this larger level to be used is that the occurrence counter counting pixel values of eight or greater must reach a predetermined value, typically twenty. This examination is done during the same sequence that the A and B register comparisons takes place. In this case, the A and B registers are loaded as explained earlier, however before they are compared the value of "ten" is added to the B register output 77 at adder 87 (FIG. 12). This sum is then compared to the magnitude of the A register output 76 at the magnitude comparator 88. If the A register value exceeds the B register plus ten, the output of the comparator 88 remains low and the JK flip flop 89 remains reset. If this comparison yields the opposite result, the JK flip flop is set indicating the occurrence counter whose magnitude in the register B is a candidate for the background value. During subsequent examinations of the A and B registers, if the counter A is loaded with the value in counter B, this same load signal 80 is used to reset the JK flip flop. This indicates a new background number has exceeded the value previously selected and a secondary criteria for the previous values of no consequence. If this reset never happens, and the JK flip flop is set, the eight or greater occurrence counter criteria is used. The eight or greater occurrence counter output 73 is compared to the value 20 as shown in FIG. 12. If the counter is greater than 20, the comparator output A>B is ANDed with the JK latch output 89 at gate 91. This signal in turn is used in adder 92 to add either one or zero depending upon the logic level of this signal compound to the value of the A counter output 83 at adder 92. This output is latched at 93 and routed to the 1 to 8 decoder 94. The output of decoder 94 determines which correlator curve is to be selected. These lines are output enable lines 0 through 4.

The selection of the proper background levels can also be illustrated by example.

EXAMPLE 1

| Occurrence Counter | Value |
|---|---|
| 0 | 5 |
| 1 | 7 |
| 2 | 45 |
| 3 | 20 |
| 4 | 10 |
| 8 | 35 |

Based on above values, the value of counter 2 is selected since it contains the largest value and the value of occurrence counter 3 is not within ten counts of counter 2.

EXAMPLE 2

| Occurrence Counter | Value |
|---|---|
| 0 | 6 |
| 1 | 9 |
| 2 | 45 |
| 3 | 38 |
| 4 | 10 |
| 8 | 17 |

Again the value of the counter 2 is chosen. The value of counter 3 is within ten counts of 2, but the value of $\geq 8$ counter is less than 20.

EXAMPLE 3

| Occurrence Counter | Value |
|---|---|
| 0 | 6 |
| 1 | 9 |
| 2 | 45 |
| 3 | 38 |
| 4 | 10 |
| 8 | 26 |

In this example the three counter is selected. Although counter 2 has the greatest value stored therein, the counter 3 is within ten of the value of counter 2 and the $\geq 8$ counter has a count greater than twenty.

The foregoing examples are illustrative of the method of which the correlator operates. Similar curve selecting circuits may use without deviation from the basic idea of selecting correct correlation curves to compensate for backgrounds of various shades and colors.

Having described the invention connection with certain specific embodiments thereof, it is to be understood that further modifications may now suggest themselves and it is intended to cover such modifications as fall within the scope of the appended claims.

What is claimed:

1. A method of continuously referencing the reflectivity of a document surface in order to distinguish the background from printed information thereon, comprising the steps of: optically scanning the document to produce picture elements representative of discrete portions of the document; quantizing a value for each picture element dependent upon the reflectivity of the documents represented by that element; processing groups of picture elements for comparing against each of a plurality of correlation curves, continually and aperiodically selecting one of the correlation curves for selecting a correlation value for each picture element.

2. The method according to claim 1, wherein the processing steps include summing the picture elements around each picture element and comparing the summed elements with the central element multiplied by the number of picture elements in the sum.

3. The method according to claim 1, including the step of counting the occurrences of a plurality of picture values in occurrence counters, and selecting the values which occurs most frequently within a particular scanned area.

4. The method according to claim 3, including the step of examining the value of the occurrence counter one level greater than the occurrence counter with the largest value in it.

5. The method according to claim 3, including the step of selecting the occurrence counter with the largest value in it when the occurrence counter with the second largest value has a value that is not within 10 counts of the value in the occurrence counter with the largest value.

6. An adaptive correlator for continuously referencing the reflectivity of a moving printed document surface in order to distinguish the background reflectivity from the printed character thereon when the document is read by an optical scanner, the output of which is discrete quantized picture elements which are correlated to determine if a picture element is part of a character or background, comprising a background determination circuit including means for continuously defining a monitored background in the vicinity of the area being read by the optical scanner, means for continually moving a correlating area through the monitored background area, the correlating area defined by a fixed number of picture elements, and means for continually and aperiodically selecting one of a plurality of correlation curves, the selection of the curve being based upon an area of the monitored background in the proximity of the picture element being correlated.

7. The adaptive correlator according to claim 6, wherein the discrete quantized picture elements are digitized data bits which are quantized into 16 levels and includes circuit means to record the occurrence of data bits at different quantized levels.

8. The adaptive according to claim 7, including means to compare the occurrence of the data bits at the different quantized levels to determine that data bit of a particular quantized level that has occurred the most times.

9. The correlator according to claim 7, including means for summing the values of the picture elements surrounding a data point picture element, and comparing the summed value with the value of the data point picture element multiplied by the number of picture elements summed and compared to the data point element.

10. The adaptive correlator according to claim 6, wherein the background determination circuit has a plurality of occurrence counters to record the digitized data bits.

11. The adaptive correlator according to claim 10, wherein said background determination circuit includes means for selecting said occurrence counter in which is recorded the largest number of data bits.

12. The adaptive correlator according to claim 11, including means for examining the value rrecorded in the occurrence counter with the largest number of data bits and then examining the value of the occurrence counter one level greater than the occurrence counter with the largest value.

* * * * *